United States Patent
Greco et al.

(10) Patent No.: US 12,045,811 B2
(45) Date of Patent: Jul. 23, 2024

(54) SECURE AND CONFIDENTIAL CUSTODIAL TRANSACTION SYSTEM, METHOD AND DEVICE USING ZERO-KNOWLEDGE PROTOCOL

(71) Applicant: Chronicled, Inc, San Francisco, CA (US)

(72) Inventors: Maurizio Greco, San Francisco, CA (US); Ryan Orr, Brisbane, CA (US); Maksym Petkus, Kyiv (UA); Jon Eric Garvin, San Francisco, CA (US); Susanne Somerville, Corte Madera, CA (US)

(73) Assignee: Chronicled Inc., San Francsco, CA (US)

( * ) Notice: Subject to any disclaimer, the term of this patent is extended or adjusted under 35 U.S.C. 154(b) by 1280 days.

(21) Appl. No.: 16/050,833

(22) Filed: Jul. 31, 2018

(65) Prior Publication Data

US 2019/0034923 A1 Jan. 31, 2019

Related U.S. Application Data

(60) Provisional application No. 62/640,819, filed on Mar. 9, 2018, provisional application No. 62/539,471, filed on Jul. 31, 2017.

(51) Int. Cl.
*G06Q 20/36* (2012.01)
*G06Q 20/10* (2012.01)
(Continued)

(52) U.S. Cl.
CPC ............ *G06Q 20/383* (2013.01); *G06Q 20/10* (2013.01); *G06Q 20/3674* (2013.01);
(Continued)

(58) Field of Classification Search
CPC .. G06Q 20/383; G06Q 20/10; G06Q 20/3674; G06Q 20/382; G06Q 20/3823;
(Continued)

(56) References Cited

U.S. PATENT DOCUMENTS

| | | |
|---|---|---|
| 6,226,619 B1 | 5/2001 | Halperin |
| 8,271,381 B2 | 9/2012 | O'Brien |

(Continued)

FOREIGN PATENT DOCUMENTS

| | | |
|---|---|---|
| CN | 103366304 A | 10/2013 |
| CN | 101951371 A | 6/2015 |

(Continued)

OTHER PUBLICATIONS

Ethan Cecchetti et al., "Solidus: Confidential Distributed Ledger Transactions via PVORM", Apr. 10, 2017, IACR, International ssocations for Cryptologic Research, vol. 20170114;174243, pp. 1-27 (Year: 2017).*

(Continued)

*Primary Examiner* — Patrick Mcatee
*Assistant Examiner* — Zesheng Xiao
(74) *Attorney, Agent, or Firm* — Haverstock & Owens A Law Corporation

(57) ABSTRACT

A system, device and method of confidential secure custodial transfers of asset between entities utilizing transaction agents implemented via a distributed ledger (e.g. a blockchain). In particular, the transaction agents securely record each of the transactions on the ledger utilizing obfuscated or proxy data state such that information about the transactions cannot be gleaned from the ledger. In particular, the transaction agents are able to enforce business rules of the system by requesting zero-knowledge proofs from participants to the transaction (e.g. sender and recipient) in place of actual data for the transaction. The zero-knowledge proofs are able (Continued)

to be designed to prevent an observer of the distributed ledger from determining any information of the transaction that is taking place.

20 Claims, 3 Drawing Sheets

(51) Int. Cl.
    *G06Q 20/38*     (2012.01)
    *H04L 9/00*     (2022.01)
    *H04L 9/06*     (2006.01)
    *H04L 9/32*     (2006.01)

(52) U.S. Cl.
    CPC ....... *G06Q 20/382* (2013.01); *G06Q 20/3823* (2013.01); *G06Q 20/3827* (2013.01); *G06Q 20/389* (2013.01); *H04L 9/0637* (2013.01); *H04L 9/3218* (2013.01); *H04L 9/3239* (2013.01); *H04L 9/50* (2022.05)

(58) Field of Classification Search
    CPC .............. G06Q 20/3827; G06Q 20/389; H04L 9/0637; H04L 9/3218; H04L 9/3239; H04L 9/50
    USPC .......................................................... 705/74
    See application file for complete search history.

(56) References Cited

U.S. PATENT DOCUMENTS

| | | | |
|---|---|---|---|
| 8,370,491 | B1 | 2/2013 | Breau et al. |
| 8,371,501 | B1 | 3/2013 | Hopkins |
| 8,543,411 | B2 | 9/2013 | Koster |
| 9,553,850 | B2 | 1/2017 | Bosko |
| 2004/0060976 | A1 | 4/2004 | Blazey et al. |
| 2004/0066278 | A1 | 4/2004 | Hughes et al. |
| 2005/0049979 | A1 | 3/2005 | Collins |
| 2006/0082438 | A1 | 4/2006 | Bazakos et al. |
| 2006/0173896 | A1 | 8/2006 | Lyon |
| 2006/0230276 | A1 | 10/2006 | Nochita |
| 2007/0038873 | A1 | 2/2007 | Oliveria |
| 2007/0095903 | A1 | 5/2007 | Suenbuel |
| 2007/0130070 | A1 | 6/2007 | Williams |
| 2007/0273558 | A1 | 11/2007 | Smith et al. |
| 2008/0223275 | A1 | 9/2008 | Kishi et al. |
| 2009/0031071 | A1 | 1/2009 | Chiu |
| 2009/0059175 | A1 | 3/2009 | Le Quesne et al. |
| 2009/0167489 | A1 | 7/2009 | Nan et al. |
| 2010/0005299 | A1 | 1/2010 | Wase |
| 2010/0060431 | A1 | 3/2010 | Stevenson et al. |
| 2010/0238002 | A1 | 9/2010 | Ryan |
| 2010/0325427 | A1 | 12/2010 | Ekberg et al. |
| 2011/0078549 | A1 | 3/2011 | Thueringer |
| 2012/0032805 | A1 | 2/2012 | Bordzik et al. |
| 2012/0127976 | A1 | 5/2012 | Lin et al. |
| 2013/0019284 | A1 | 1/2013 | Pacyga |
| 2013/0073845 | A1* | 3/2013 | Teranishi ............... H04L 9/3221 |
| | | | 713/175 |
| 2014/0108258 | A1 | 4/2014 | Williams |
| 2014/0136431 | A1 | 5/2014 | Dahod et al. |
| 2014/0266591 | A1 | 9/2014 | Klammer et al. |
| 2014/0282974 | A1 | 9/2014 | Maher et al. |
| 2014/0286491 | A1 | 9/2014 | Atherton |
| 2015/0039470 | A1 | 2/2015 | Crites |
| 2015/0134552 | A1 | 5/2015 | Engels et al. |
| 2015/0317481 | A1* | 11/2015 | Gardner ................. G06F 21/57 |
| | | | 726/2 |
| 2015/0332002 | A1 | 11/2015 | Zielinski |
| 2016/0005039 | A1 | 1/2016 | Taveau et al. |
| 2016/0085955 | A1 | 3/2016 | Lerner |
| 2016/0098730 | A1 | 4/2016 | Feeney |
| 2016/0162897 | A1 | 6/2016 | Feeney |
| 2016/0164884 | A1 | 6/2016 | Skuchain et al. |
| 2016/0192188 | A1 | 6/2016 | Coulier |
| 2016/0253622 | A1* | 9/2016 | Sriram ................. H04L 9/3247 |
| | | | 713/179 |
| 2016/0294783 | A1 | 10/2016 | Piqueras |
| 2016/0300234 | A1 | 10/2016 | Moss-Pultz |
| 2016/0321654 | A1 | 11/2016 | Lesavich et al. |
| 2016/0330034 | A1 | 11/2016 | Back et al. |
| 2016/0335609 | A1 | 11/2016 | Jenkins |
| 2016/0358158 | A1 | 12/2016 | Radocchia et al. |
| 2016/0358184 | A1 | 12/2016 | Radocchia et al. |
| 2016/0358186 | A1 | 12/2016 | Radocchia et al. |
| 2016/0358187 | A1 | 12/2016 | Radocchia et al. |
| 2017/0149796 | A1 | 5/2017 | Gvili |
| 2017/0300928 | A1 | 10/2017 | Radocchia et al. |
| 2017/0345019 | A1 | 11/2017 | Radocchia et al. |
| 2017/0352012 | A1 | 12/2017 | Hearn et al. |
| 2017/0366347 | A1 | 12/2017 | Smith |
| 2018/0012311 | A1 | 1/2018 | Small |
| 2018/0019872 | A1 | 1/2018 | Radocchia et al. |
| 2018/0032759 | A1 | 2/2018 | Radocchia |
| 2018/0053161 | A1 | 2/2018 | Bordash |
| 2018/0063105 | A1 | 3/2018 | Poon |
| 2018/0108024 | A1 | 4/2018 | Greco |
| 2018/0211718 | A1 | 7/2018 | Heath |
| 2018/0264347 | A1 | 9/2018 | Tran |
| 2018/0315026 | A1* | 11/2018 | Kraemer .............. G06Q 20/383 |

FOREIGN PATENT DOCUMENTS

| | | |
|---|---|---|
| CN | 102779284 A | 6/2015 |
| CN | 102955958 A | 6/2015 |
| CN | 106600403 A | 4/2017 |
| CN | 106982205 A | 7/2017 |
| WO | 9419770 A1 | 9/1994 |
| WO | 2004036802 A1 | 4/2004 |

OTHER PUBLICATIONS

Andreas M. Antonopoulos, Mastering Bitcoin, O' Reilly Media Inc., Apr. 2014, pp. 1-282.
International Preliminary Report and Written Opinion dated Feb. 13, 2020 from International Application No. PCT/US2018/044609.
International Search Report and Written Opinion dated Oct. 10, 2018 from International Application No. PCT/US18/44609.
Chinese Office Action dated Jul. 30, 2020 from Chinese Patent Application No. 2016800460074.
Rejection Decision dated Sep. 3, 2021 for Chinese Patent Application No. 201680046007.4.
Supplementary European Search Report, Application No. 19764493.3, dated Feb. 21, 2022, Applicant: Chronicled Inc., 7 pages.
International Preliminary Report on Patentability dated May 2, 2019 for Application No. PCT/US2017/056791.
International Report on Patentability from PCT Application No. PCT Application No. PCT /US2016/035902, dated Dec. 14, 2017.
International Search report and Written Opinion from International Application No. PCT/2017/056791.
International Search Report and Written Opinion from International Application No. PCT/US2017/54004.
International Search report and Written Opinion for PCT Application No. PCT/US2017/55605.
International Search Report from PCT/US16/035902 dated Oct. 26, 2016.
Ethan Cecchetti et al., "Solidus; Confidential Distributed Ledger Transactions via PVORM", IACR, International Assocations for Cryptologic Research, vol. 20170114;174243, Apr. 10, 2017 (Apr. 10, 2017), pp. 1-27, XP061023066, DIO: 10.1145/3133954. 3134010 [retrieved on Apr. 10, 2017] *the whole document*.
Extended European Search Report dated Mar. 31, 2021 for European Patent Application No. 18840833.0.
Office Action dated Dec. 3, 2021 for Chinese Patent Application No. 201880060683.6.
European Office Action dated Mar. 6, 2020 from European Application No. 16804599.5.
International Preliminary Report for the International application PCT/US2019/021485 dated Sep. 24, 2020.

(56) References Cited

OTHER PUBLICATIONS

Melanie Swan, "Blueprint for a New Economy", Feb. 8, 2015, XP055279098, ISBN:978-1-4919-2049-7.
European search report for the EP application 16 80 4599 dated Nov. 29, 2018.

* cited by examiner

SECURE AND CONFIDENTIAL CUSTODIAL TRANSACTION SYSTEM, METHOD AND DEVICE USING ZERO-KNOWLEDGE PROTOCOL

RELATED APPLICATIONS

This application claims priority under 35 U.S.C. § 119(e) of U.S. provisional patent application Ser. No. 62/539,471 filed Jul. 31, 2017, and titled "A METHOD TO VALIDATE SUPPLY CHAIN TRANSACTIONS ACROSS TRADING PARTNERS, VERIFYING END-TO-END PROVENANCE OF TRADING ITEMS WHILE MAINTAINING CONFIDENTIALITY" and U.S. provisional patent application Ser. No. 62/640,819, filed Mar. 9, 2018, and titled "DECENTRALIZED ANONYMOUS TRANSFER SYSTEM, METHOD AND DEVICE," both of which are hereby incorporated by reference.

FIELD OF THE INVENTION

The present invention relates to the field of custodial transfers of registered items. More particularly, the present invention relates to the enabling of the confidential custodial transfer of items between entities using a distributed ledger for custodial recording.

BACKGROUND OF THE INVENTION

Counterfeit goods find their way to the consumer through the supply chain. The challenge of tracking goods throughout the supply chain and the inability for its participants to create a verifiable chain of custody is a barrier to fight counterfeiting and monitor how goods are moving through the supply chain. Additionally, current solutions lack the ability of shielding information about the transactions involving the goods and thus are vulnerable to the stealing of information from parties to the supply chain by reviewing the transaction ledger.

SUMMARY OF THE INVENTION

A system, device and method of confidential secure custodial transfers of asset between entities utilizing a zero knowledge protocol, that can optionally leverage distributed ledger-based technologies such as blockchain and transaction agents (e.g. smart contracts). In particular, the transaction agents (or technology such as chain-code or database programs) securely record each of the transactions on the ledger utilizing obfuscated or proxy data state such that information about the transactions cannot be gleaned from the ledger. In particular, the transaction agents are able to enforce business rules of the system by requesting zero-knowledge proofs from participants to the transaction (e.g. sender and recipient) in place of actual data for the transaction. The zero-knowledge proofs are able to be designed to prevent an observer of the distributed ledger from determining any information of the transaction that is taking place. Yet, the transaction agent can use the proofs to verify access rights, correctness of the transaction and compliance of the operation according to the defined business rules and system state. Such proofs are also used to update the system state without disclosing on the distributed ledger information about the participants to the transactions, the identifier that is subject of the transaction and logical links across participants, identifiers and transactions. Thus, the system eliminates the possibility of mining the data from the ledger to extract undesired data correlations and it protects against leak of business intelligence on the distributed ledger.

In some embodiments, the transaction agents are able to leverage verification functions implemented as zk-SNARK circuits in order to validate the submitted proofs. Further, in order for a recipient to complete a transaction, the transaction agent can require the recipient to receive certain data from the current custodian (e.g. sender). This is able to be achieved via a private, secure, peer-to-peer message between the current custodian and the recipient. By using the data included in the message, the recipient can accept custody of an identifier. By limiting the information sharing only between the parties involved in the transaction, the system provides a high level of privacy. As a result, the system enables the secure transfer of a physical or electronic item marked with unique identifiers (such as serialized global trade item number (SGTIN) in the Global Standards One (GS1) standards) on a shared ledger while maintaining confidentiality of transactions, and also enabling verification of receipt at each stage as well as full end-to-end provenance verification of an item ex-post by an actor that has not participated to the transactions (such as a regulator).

A first aspect is directed to a zero knowledge transfer system for transferring one or more assets each associated with an asset identifier, a salt value, a custody pass and an identifier hash. The system comprises a distributed ledger including at least one transaction agent and a ledger, the ledger associating the identifier hash of each of the assets with a custodian hash that is derived from a custodian identifier identifying a current custodian of the asset, wherein the at least one transaction agent includes a transfer function that changes the custodian hash associated with the identifier hash of one of the assets to a different custodian hash that is derived from a different custodian identifier identifying a new current custodian of the asset if one or more transfer requirements are completed, a receiving device including a first secure transfer agent, the first secure transfer agent having a receive function and a transferring device including a second secure transfer agent, the second secure transfer agent having a transmit function.

In some embodiments, upon selection of an asset and input of recipient identifier identifying a recipient to which the asset is to be transferred, the transferring device via the transmit function generates a redemption token for the asset by hashing the recipient identifier and a randomly generated redemption value together, creates a zero-knowledge sender proof for the asset identifier of the asset, the salt value, the redemption value, a sender identifier identifying a current custodian of the asset and the custody pass of the asset and sends the asset identifier, the salt value and the sender proof to the receiving device. In some embodiments, upon selection of the receive function for the asset, the receiving device via the receive function generates a new custody pass for the asset and a new custodian hash for the asset based on the recipient identifier and the new custody pass, creates a zero-knowledge recipient proof for the asset identifier of the asset, the salt value, the redemption value, the recipient identifier and the new custody pass and invokes the transfer function of the transaction agent on the distributed ledger and submits the identifier hash of the asset, the new custodian hash, the redemption token, the sender proof and the recipient proof to the transaction agent.

In some embodiments, upon invocation of the transfer function, the transaction agent verifies the validity of the sender proof and the recipient proof, and if valid, changes the custodian hash associated with the identifier hash of the asset to the new custody hash. In some embodiments, the transfer requirements comprise the sender identifier corresponding to the current custodian hash. In some embodiments, upon selection of a registration function of the second secure transfer agent, the transferring device via the registration function creates the asset identifier, the salt value and the custody pass, generates the identifier hash based on a hash of the asset identifier and the salt value, generates the custodian hash based on a hash of the sender identifier, the custody pass and the salt value and generates a zero-knowledge registration proof for the identifier hash and the custodian hash and invokes a registration function of the transaction agent on the distributed ledger and submits the identifier hash of the asset, the custodian hash and the zero-knowledge registration proof to the transaction agent.

In some embodiments, upon invocation of the registration function, the transaction agent verifies that the identifier hash does not already exist on the distributed ledger, verifies the validity of the registration proof, and if valid, changes the custodian hash associated with the identifier hash of the asset to the new custody hash and if the identifier does not already exist and the registration proof is valid, associates the identifier hash with the custodian hash on the distributed ledger. In some embodiments, the system further comprises a verification device including a verification agent, wherein upon selection of a verification function of the verification agent, the verification device via the verification function generates and transmits a verification request including the asset identifier of the asset that is to be verified to both the first secure transfer device and the second secure transfer device and verifies the validity and completeness of the proofs against data associated with the asset identified by the asset identifier on the distributed ledger.

A second aspect is directed to a method of securely transferring one or more assets each associated with an asset identifier, a salt value, a custody pass and an identifier hash. The method comprises receiving, with a transfer agent of a first secure transfer device, a selection of an asset and input of a recipient identifier identifying a recipient to which the asset is to be transferred, generating a redemption token for the asset with the transfer agent by hashing the recipient identifier and a randomly generated redemption value together, creating a zero-knowledge sender proof for the asset identifier of the asset with the transfer agent based on the salt value, the redemption value, a sender identifier identifying a current custodian of the asset and the custody pass of the asset and sending the asset identifier, the salt value and the sender proof to a second secure transfer device with the transfer agent. In some embodiments, the method further comprises associating the identifier hash of the asset with a custodian hash with a transaction agent of a distributed ledger, wherein the distributed ledger includes at least one transaction agent and a ledger, the ledger storing the association of the identifier hash and the custodian hash, wherein the custodian hash is derived from a custodian identifier identifying a current custodian of the asset. In some embodiments, the method further comprises changing the custodian hash associated with the identifier hash of the asset to a different custodian hash that is derived from a different custodian identifier identifying a new current custodian of the asset with the transaction agent when one or more transfer requirements are completed.

In some embodiments, the method further comprises receiving, with the transfer agent of the first secure transfer device, selection of a receive function of the transfer agent for the asset, generating a new custody pass for the asset and a new custodian hash for the asset with the transfer agent based on the recipient identifier and the new custody pass, creating a zero-knowledge recipient proof for the asset identifier of the asset, the salt value, the redemption value, the recipient identifier and the new custody pass with the agent and invoking a transfer function of the transaction agent on the distributed ledger and submitting the identifier hash of the asset, the new custodian hash, the redemption token, the sender proof and the recipient proof to the transaction agent with the agent.

In some embodiments, upon invocation of the transfer function, the transaction agent verifies the validity of the sender proof and the recipient proof, and if valid, changes the custodian hash associated with the identifier hash of the asset to the new custody hash. In some embodiments, the transfer requirements comprise the sender identifier corresponding to the current custodian hash. In some embodiments, the method further comprises receiving selection of a registration function of the secure transfer agent with the device, creating the asset identifier, the salt value and the custody pass with the agent, generating the identifier hash with the agent based on a hash of the asset identifier and the salt value, generating the custodian hash with the agent based on a hash of the sender identifier, the custody pass and the salt value, generates a zero-knowledge registration proof for the identifier hash and the custodian hash with the agent, invoking a registration function of the transaction agent on the distributed ledger with the agent and submitting the identifier hash of the asset, the custodian hash and the zero-knowledge registration proof to the transaction agent with the agent.

In some embodiments, upon invocation of the registration function, the transaction agent verifies that the identifier hash does not already exist on the distributed ledger, verifies the validity of the registration proof, and if valid, changes the custodian hash associated with the identifier hash of the asset to the new custody hash and if the identifier does not already exist and the registration proof is valid, associates the identifier hash with the custodian hash on the distributed ledger. In some embodiments, the method further comprises receiving selection of a verification function of a verification agent of a verification device, generating and transmitting a verification request including the asset identifier of the asset that is to be verified to both the first and the second secure transfer devices with the verification agent and verifying the validity and completeness of the proofs against data associated with the asset identified by the asset identifier on the distributed ledger.

A third aspect is directed to a secure transfer device for transferring one or more assets each associated with an asset identifier, a salt value, a custody pass and an identifier hash. The device comprises a display, a processor and a non-transitory computer readable memory storing a secure transfer agent including a transmit function, wherein upon selection of an asset and input of recipient identifier identifying a recipient to which the asset is to be transferred, the agent generates a redemption token for the asset by hashing the recipient identifier and a randomly generated redemption value together, creates a zero-knowledge sender proof for the asset identifier of the asset, the salt value, the redemption value, a sender identifier identifying a current custodian of the asset and the custody pass of the asset and sends the asset identifier, the salt value and the sender proof to the receiving device.

In some embodiments, a distributed ledger includes at least one transaction agent and a ledger, the ledger associating the identifier hash of each of the assets with a custodian hash that is derived from a custodian identifier identifying a current custodian of the asset, wherein the at least one transaction agent includes a transfer function that changes the custodian hash associated with the identifier hash of one of the assets to a different custodian hash that is derived from a different custodian identifier identifying a new current custodian of the asset if one or more transfer requirements are completed, and further wherein the agent includes a receiver function and upon selection of the receive function for the asset, the agent generates a new custody pass for the asset and a new custodian hash for the asset based on the recipient identifier and the new custody pass, creates a zero-knowledge recipient proof for the asset identifier of the asset, the salt value, the redemption value, the recipient identifier and the new custody pass and invokes the transfer function of the transaction agent on a distributed ledger and submits an identifier hash of the asset, the new custodian hash, the redemption token, the sender proof and the recipient proof to the transaction agent.

In some embodiments, the agent includes a registration function and upon selection of the registration function, the agent creates the asset identifier, the salt value and the custody pass, generates the identifier hash based on a hash of the asset identifier and the salt value, generates the custodian hash based on a hash of the sender identifier, the custody pass and the salt value and generates a zero-knowledge registration proof for the identifier hash and the custodian hash and invokes a registration function of the transaction agent on the distributed ledger and submits the identifier hash of the asset, the custodian hash and the zero-knowledge registration proof to the transaction agent. In some embodiments, the agent includes a verification function and upon selection of the verification function, the agent generates and transmits a verification request including the asset identifier of the asset that is to be verified to all other secure transfer devices in communication with the device and verifies the validity and completeness of the proofs against data associated with the asset identified by the asset identifier on the distributed ledger.

DETAILED DESCRIPTION OF THE INVENTION

Embodiments described herein are directed to a protocol, system, device and method of confidential secure custodial transfers of asset between registered entities utilizing transaction agents (e.g. smart contracts) implemented via a zero knowledge protocol and a distributed ledger (e.g. a blockchain). In particular, a ledger that securely records each of the transactions utilizes a shielded or proxy data state such that information about the transactions cannot be gleaned from the ledger. As a result, the system is necessarily rooted in the computer technology of distributed ledger records to overcome the problem of the necessary public nature of the records a problem specifically arising in distributed ledgers due to their publicly accessible recording nature. In particular, the system provides the benefit of overcoming this inherent lack of confidentiality of a distributed ledger transaction recording technology by providing a protective layer of confidentiality to the distributed ledger by only displaying a proxy status of transactions, wherein the actual identifiers of the transactions cannot be derived from the proxy status.

Figure 1:
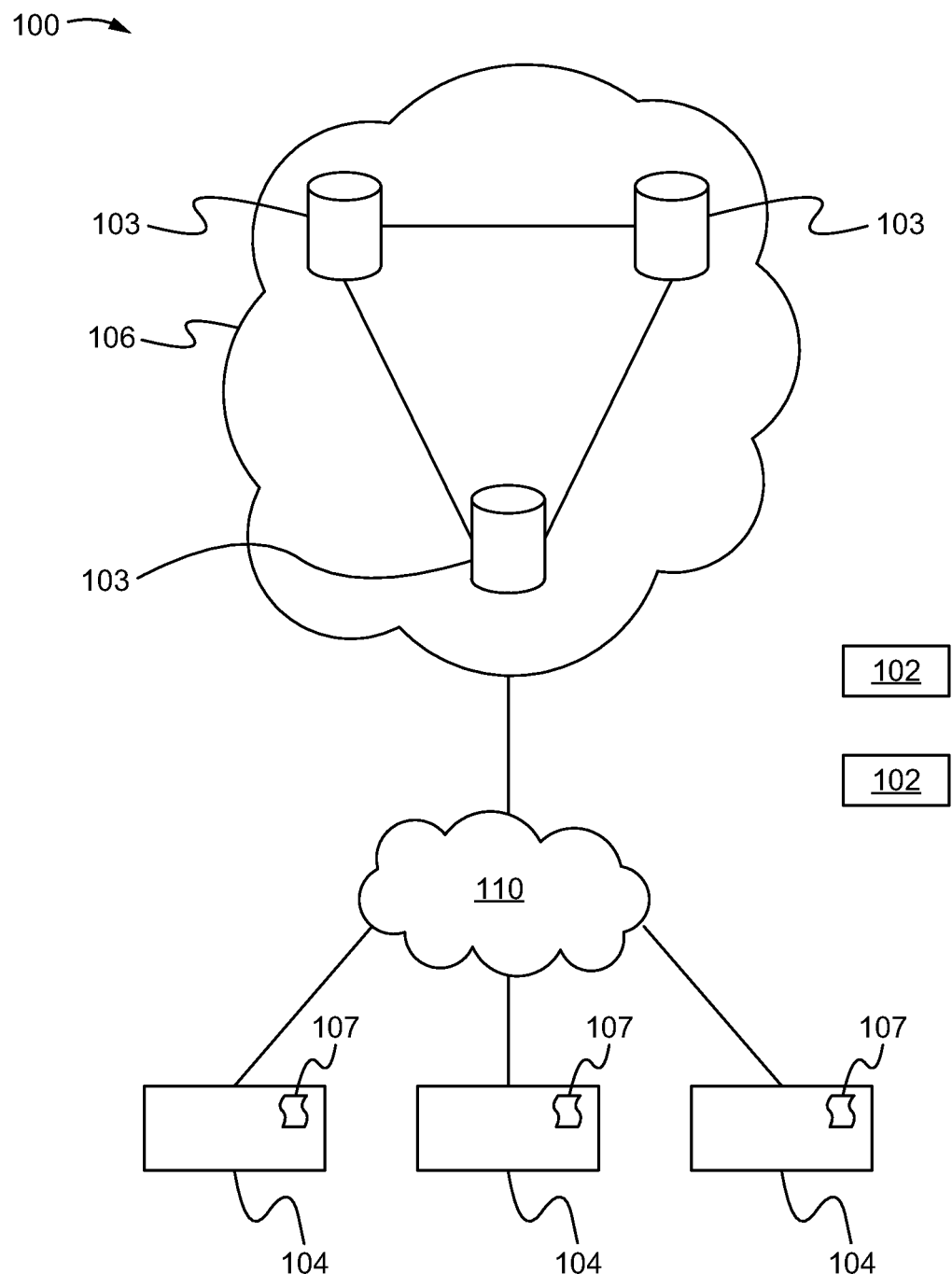
FIG. 1 illustrates a distributed ledger confidential transfer system according to some embodiments.

FIG. 1 illustrates a distributed ledger confidential transfer system 100 according to some embodiments. As shown in FIG. 1, the system 100 comprises one or more physical or virtual assets/items 102 each having an item identifier, one or more transfer devices 104 each having a memory storing a transfer agent 107 and a receiver/transmitter, and a distributed ledger 106 including an item transaction ledger, wherein the distributed ledger 106 and/or the transfer devices 104 are communicatively coupled via one or more networks 110. In some embodiments, the item identifiers are able to be stored on one or more tags or labels coupled to the items 102. In some embodiments, the distributed ledger 106 is able to be implemented on one or more servers 103, also referred to as nodes (e.g. blockchain nodes). Although as shown in FIG. 1, a distributed ledger 106 is coupled with three client transfer devices 104, it is understood that any number of distributed ledgers 106 are able to be coupled with any number of transfer devices 104. The networks 110 are able to be one or a combination of wired or wireless networks as are well known in the art. One or more servers are able to store/operate at least a portion of the transfer agents 107 (optionally including a graphic user interface) on a memory of one or more of the servers. As a result, a user is able to download the agent 107 from the servers 108 over the network 110 onto one or more of the transfer devices 104. After being downloaded to the client transfer device 104, the agent 107 is able to create and use an application database within the local memory on the transfer device 104 to store and utilize data necessary for operation.

Alternatively, some or all of the data is able to be stored in a server database on the memory on the servers such that the agent 107 is able to connect to the servers over the networks 110 in order to utilize the data on the server database. For example, the locally executing agent 107 on the transfer devices 104 is able to remotely communicate with the servers over the network 110 to perform any features of the agent 107 and/or access any data on the server database not available with just the data on the transfer device 104. In some embodiments, the same data is stored on both the server database and one or more of the transfer devices 104 such that either local or remote data access is possible. In such embodiments, the data on the servers and/or transfer devices 104 is able to be synchronized by the application. In some embodiments, the server database and/or agent 107 is distributed across a plurality of the servers. Alternatively or in addition, one or more of the servers are able to store all of the database and/or application data. In such embodiments, the servers are able to perform a synchronization process such that all the databases and/or other application data are synchronized.

Alternatively, the agent 107 is able to be replaced or supplemented with a website stored on the server memory and executed by the servers, wherein the website provides some or all of the functionality of the agent 107 with a website user interface. In such embodiments, a transfer device 104 is able to access the website and utilize the features of the agent and/or website with a web browser that communicates with the servers over the networks 110. In some embodiments, the functionality of the website is able to be limited to facilitating the downloading of the agent 107 onto one or more transfer devices 104. In other words, the application/agent 107 is able to operate on just the servers, just the transfer devices 104 or a combination of the servers and transfer devices 104. Accordingly, it should be noted that although described according to an exemplary functional distribution herein, other distributions of the functions of the application/agent 107 between the servers (via the website) and the transfer devices 104 (via the application) are contemplated but not included for the sake of brevity. In some embodiments, the items 102 are able to be an autonomous machine such as a drone or an identity/internet of things (IOT) device. In some embodiments, the agent 107 is able to be already installed in the transfer device 104 or is able to be part of the software or firmware operating the transfer device 104 itself.

The transfer devices 104 are able to be any transfer device having a memory for storing at least a portion of the agent 107. In some embodiments, the devices 104 comprise a display (e.g. a touchscreen). Examples of suitable transfer devices 104 capable of storing the agent 107 include smart jewelry (e.g., smartwatch), a personal computer, a laptop computer, a computer workstation, a server, a mainframe computer, a handheld computer, a personal digital assistant, a cellular/mobile telephone, an IOT device, a smart appliance, a game console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system or any other suitable transfer device. In some embodiments, the transfer devices 104 are able to include a wireless tag reading feature capable of wirelessly reading and/or communicating with the tags or identifiers coupled to the items 102. For example, the transfer devices 104 are able to communicate wirelessly with the tags/labels via one or more of near field communication, sub-gigahertz frequencies, bluetooth low energy (BLE), radio frequency identification (RFID), bluetooth, WiFi or other types of wireless communication known in the art. Further, the devices 104 are able to be integrated into supply chain equipment (e.g., bar code scanner, optical character recognition (OCR) readers, RFID readers, near field communication (NFC) readers, convey belts, packaging machines) that is able to read and/or write data to the targeted distributed ledger 106, transaction ledger, tags and/or servers.

The items 102 are able to be physical objects (e.g. receptacles, containers, parcels, envelops, packages, boxes, and any cases that might hold products or components that form a device, machine, apparatus or utensil) having one or more cavities for storing food, medicine, medical samples, evidence or other items and sealing elements for selectively sealing/unsealing the cavities (e.g. zippers, doors, covers, sliders, lids, flaps, and other types of sealing appendages known in the art). Alternatively or in addition, the items 102 are able to be collectibles, IOT devices, apparel, shoes, hand bags, garments, products and/or other physical items. For example, the items are able to be bars of gold bullion or athlete drug test samples. Alternatively, the items 102 are able to be virtual items/assets.

In some embodiments where the items 102 have tags storing some or part of the identifiers, the tags are able to be substantially similar to the tags described in U.S. patent application Ser. No. 15/785,086, filed Oct. 16, 2017 and entitled "Distributed ledger FOR PROVENANCE AND TRACKING OF GOODS IN THE SUPPLY CHAIN," which is hereby incorporated by reference. In such embodiments, the tags and the transfer devices 104 are able to communicate wirelessly via near field communication, bluetooth low energy (BLE), radio frequency identification (RFID), bluetooth, WiFi or other types of wireless communication known in the art. Further, the tags are able to be public key infrastructure enabled, able to store a unique identifier and a private key and wirelessly communicate with the readers of the transfer devices 104. The private key is secret and cannot be read or extracted from the tag (e.g. cannot be read by the reader). In contrast, the unique identifier is able to be read by a reader and/or otherwise transmitted from the tag to one or more of the transfer devices 104 when requested by the transfer devices 104. The private key is an encryption key that is associated with a corresponding public key. In other words, the public key and private keys are related such that data encrypted with the public key are only able to be decrypted using the private key and digital signatures generated by the private key are only able to be validated using the public key. The unique identifier of the items 102 is able to be a SGTIN, the public key (associated with the private key stored on the tag), a hash of the public key, a universally unique identifier (UUID), another unique identifier or a combination thereof.

The distributed ledger 106 is able to store distributed ledger data and is able to be a database, a public blockchain, a permissioned blockchain (where participant nodes must be authorized to join the network), and/or a collection of transaction agents whose records are open to the public or all authorized participants in a permissioned blockchain (e.g. access to view records is not permission based, but ownership/transfer protocol requirements for making changes to database). For example, the distributed ledger 106 is able to be a distributed database (e.g. across a plurality of computing devices that each store copies of transactions in one or more linked blocks) that maintains a continuously-growing list of data records or contracts (e.g. item information of the items associated with the unique identifiers, provenance or chain of ownership/custody transactions associated with pairs of public keys and unique identifiers, digital signatures of a person/identity utilizing the pairs of public keys and unique identifiers) hardened against tampering and revision. In particular, the distributed ledger 106 is able to be a blockchain with a built-in Turing-complete programming language, allowing anyone to write transaction agents (e.g. cryptographic "boxes" that contain value and only unlock it if certain conditions are met) and decentralized applications where they can create their own arbitrary rules for ownership, transfer formats and state transition functions. As a result, in such embodiments, the distributed ledger 106 is able to both be used to securely identify entities (e.g. registrants, items, devices) based on stored public keys and to securely record changes of custody of items 102 based on designated contracts on the distributed ledger 106 associated with the items 102.

In some embodiments, the distributed ledger 106 is a blockchain and consists of data structure blocks which hold exclusively data or proxy data (e.g. proxy ownership data, item identification data) with each block holding batches of individual transactions and the results of any distributed ledger executables. Alternatively, the blocks are able to store both data and programs/scripts (e.g. smart contracts). Each block of the distributed ledger contains a timestamp and information linking it to a previous block (and indicating a time of the transaction) thereby defining the chain and maintaining a chronological order of each of the records/transactions. Alternatively, the distributed ledger 106 is able to be a non-blockchain database.

The distributed ledger data is able to comprise a ledger including pairs of data representing items 102 and the current and/or past custodian of those items 102. For example, as described in detail below, items 102 are able to be registered on the ledger with an initial custodian/registrant being associated with the item 102. This association is able to be kept confidential by the ledger recording the results of functions/hashes applied to the actual data (e.g. an item identifier hash representing the item identifier and a custodian hash representing the custodian identifier) such that the actual data can only be determined using proofs designed to decode/reverse the functions/hashes. As a result, the ledger is able to confidentially record each change of custody of an item 102 (e.g. as executed/verified/recorded by a custody transaction agent described below) is able to be reflected on the chain of custody on the distributed ledger 106 for that item 102 indicating one or more of a timestamp, the item 102 identifier (e.g. item identification hash) a new custodian (e.g. custodian hash) and/or other information about the item 102, the new custodian, the previous custodian or the transaction itself.

In some embodiments, the functions are able to be a cryptographic hashing function, such as secure hash algorithm (SHA)-256, SHA-3 or other cryptographic functions. Additionally, the distributed ledger data is able to comprise one or more business rules/policies that are enforced by one or more of the transaction agents (i.e. smart contract data describing and enforcing relationships between the items 102 and/or the users). The users are able to be manufacturers, authenticators, registrants, owners and/or other entities associated with the item 102.

In some embodiments, upon registering with the server and/or distributed ledger 106, users are given a set of public and private keys, wherein the public key serves as the digital identity of the user (i.e. entity) on the distributed ledger and the private key is used by the user to digitally sign or otherwise authenticate messages to the distributed ledger 106 and/or other users. Alternatively, the user identities on the distributed ledger 106 are able to be implemented via digital certificates (e.g. X.509 certificates), username-password or a combination thereof.

The transaction agents of the distributed ledger 106 are able to comprise "change of custody" contracts that define and enforce rules of officially changing digital custody of an item 102 as reflected on the distributed ledger 106. In particular, in order for a change in custody to be executed or added to the distributed ledger 106 (e.g. on the chain of custody for that item 102), a current custodian and the receiving custodian must submit data satisfying the change of custody requirements defined by the contract. For example, the contracts are able to require proof of the transferor as being the current custodian (as indicated on the distributed ledger 106), identification of the desired transferee (e.g. digital identity), proof by the transferee as being the desired transferee upon receiving the item 102, and/or any other requirements (e.g. times, dates, quantities, payments received). As another example, the custody requirements are able to require that only one participant can have custody of an identifier at any given time, only the current custodian can transfer an identifier, a transfer is not executed until an identifier is accepted by the recipient, and/or optionally, only certain entities (e.g., manufacturers) can create identifiers in the system. In other words, each transaction agent on the distributed ledger 106 is able to enforce business rules, maintain an obfuscated image that proxies the truthful state of the system 100, and accept, validate and commit transactions that comply with the business rules and the current state of the system 100. The proxy of the system state is able to be represented by cryptographic hashes of the actual data of the state, which is used to validate transactions without revealing the actual values, using zero-knowledge cryptographic methods.

In some embodiments, the agent 107 is able to include the features described in U.S. patent application Ser. No. 15/785,086, except for the differences described herein. Specifically, the agent 107 is able to comprise a register function, a transfer function, a receiver function and/or a verification function, wherein the application user interface is configured to enable users to utilize the functions/modules. The agent 107 and the functions are able to use the application database to store, maintain and access data necessary for the operation of the agent 107. As a result, the transfer agent 107 enhances the functionality of the devices 014 themselves by enabling them to securely register and transfer digital custody of items 102 without exposing confidential or other data that would give others a competitive advantage.

The registration function enables the device 104 to create one or more accounts on the distributed ledger 106. Specifically, the registration function enables the device 104 to create a user profile/account by inputting username and password information via the graphical user interface that is then associated with the account such that the information is able to be used to identify the user when logging onto the application. Alternatively, the login information is able to be omitted and a user is able to use the application without creating a user account or logging in. After a user account is created, the user is able to be assigned a unique user identifier (e.g. a private and public key pair and/or another unique identifier), wherein the unique user identifier is added to the distributed ledger to create the device/user's digital identity. In some embodiments, the unique user identifier is stored on the agent 107 on the device 104 when registering. Accordingly, the user is then able to access their account by entering the username, password and/or user identifier in order to identify themselves to the agent 107. In some embodiments, during the creation of the account or subsequently, additional information is able to be stored and associated with the account such as, but not limited to, contact information (e.g. phone number, email, address), submitted content (e.g. item images, descriptions), account privileges/subscription information (e.g. unlocked application features), friends or other trusted accounts on the system and payment information (e.g. currency/bank accounts for receiving/transmitting currency based on the transaction agents). In some embodiments, the additional information is submitted by a user upon logging into the account. Alternatively, some or all of the additional information is able to be applied to the account automatically by the application based on interactions by the user with the application.

Further, the registration function enables the device 104 to register one or more items 102 in order to create digital identities for the items 102 on the distributed ledger 106 and associate those digital identities with a current custodian (e.g. the registrant). Specifically, in order to register an item 102, the transfer device 104 creates an identifier for the item 102 using the agent 107 in response to receiving a registration command from a user via the user interface. In some embodiments, the agent 107 enables the item identifier to be entered by a user of the device 104 via the user interface. Alternatively, the agent 107 is able to randomly generate or assign a value as the item identifier for the item 102. In some embodiments, the item identifier has the format of or is able to be an SGTIN of the item 102. In some embodiments, the item identifier is stored or written on a tag or label coupled to the item 102 (e.g. a public key stored on the tag coupled to the item 102). The transfer device 104 randomly generates a salt value for the item 102 "identifierSalt," for example, using a cryptographically secure random number generator of the agent 107. In some embodiments, the salt value is a cryptographic salt, wherein in cryptography, a salt is random data that is used as an additional input to a one-way function that "hashes" data (e.g. a password or passphrase). Similarly, the transfer device randomly generates a custody pass value for the item 102, for example, using the cryptographically secure random number generator of the agent 107. In some embodiments, the device 104 saves the generated values in a secure storage with the agent 107 (e.g. a local or remote wallet, a vault, database) for future use.

The device 104 then generates an item identifier hash and a custodian hash based on one or more of the item identifier, the salt value, the custody pass value, the registrant identifier or a combination thereof. The identifier hash is able to confidentially represent the identity of the item 102 on the distributed ledger 106 and the custodian hash is able to confidentially represent the identity of the current custodian of the item 102 on the distributed ledger 106. It should be noted that the registrant identifier is able to be the identifier assigned to the device/registrant upon creating an account (as described above), dynamically assigned/created randomly by the agent 107 and/or submitted to the agent 107 by the registrant (e.g. upon request/prompting by the agent 107) via the user interface. An example of how to create hashes that cannot be traced on the distributed ledger 106 is:

identifierHash=hash(identifier|identifierSalt)

custodianHash=hash(registrantIdentity|custodyPass|identifierSalt)

As described herein hashing is able to refer to a cryptographic hashing function (e.g. SHA-256) or other strong cryptographic one-way functions.

The device 104 also generates a zero-knowledge proof for both of the above hashes, wherein only with access to the proofs and the identifier hash and custodian hash values are the values underlying the hashes (e.g. item identifier, salt value, registrant identity, custody pass value) able to be determined. As a result, the actual identities of the item 102, the registrant and/or any other data is able to be protected despite being accessible on the ledger of the distributed ledger 106. As such, the system solves the distributed ledger based problem of achieving confidentiality on a distributed ledger 106 ledger that needs to be accessible.

The device 104 is then able to initiate the registration on the distributed ledger 106 by contacting a transaction agent on the distributed ledger 106 that is associated with the desired business rules/requirements that are desired to be enforced with respect to the item 102. In some embodiments, the agent 107 enables and/or prompts the user to identify the desired transaction agent. The device 104 sends the identifier hash, the custodian hash and the associated proof(s) to the transaction agent along with the request for registration of the item 102 on the distributed ledger 106. The transaction agent then verifies that the identifier hash does not already exist on the distributed ledger 106 by comparing it to a list of all of the existing identifier hash values currently being stored (and/or associated with that transaction agent). If it already exists, the transaction fails because each of the recorded identifier hashes need to be unique (such that they and the items 102 they represent can be distinguished). If not, the transaction agent verifies that the transaction initiator (e.g. agent 107) possesses source values (e.g. item identifier, salt value, registrant identifier, custody pass value) which resulted in provided hashes (e.g. identifier hash, custodian hash using the proofs to validate the hashes.

If the values are successfully verified, the transaction agent stores the association between the custodian hash and the identifier hash as a part of the digital identity (e.g. a chain of custody field) on the ledger of the distributed ledger 106. In some embodiments, the association is in the form of an array where previous custodian hashes are maintained as new "current" custodian hashes are added thereby maintaining a history of custody/provenance of the digital identity. Alternatively, when new custodian hashes are verified, the previously stored custodian hash is replaced with the new current custodian hash such that only the current custodian is maintained. Thus, upon invocation of the registration function, the agent is able to verify that the identifier hash does not already exist on the distributed ledger 106, verifies the validity of the registration proof, and if valid, creates the identifier hash, the custodian hash and an association between them on the ledger 106. In some embodiments, the registration function does not succeed if the identifier hash already exists on the ledger 106.

The transfer function enables the device 104 to transfer one or more digital identities of the items 102 that are registered on the distributed ledger 106 which will associate the identities with a new "current" custodian (e.g. the recipient). Specifically, in order to transfer an identity of an item 102, upon receiving a transfer request via the user interface, the transfer device 104 retrieves the salt value ('identifierSalt') and the custody pass for the item 102/item identifier/digital identity that is to be transferred. In some embodiments, a user selects the item 102 to be transferred from a list of available items 102 (e.g. a list of items 102 that are associated with the transferor's digital identity/identifier on the system 100) and a desired recipient from a list of possible recipients on the system 100 all provided by the agent 107 via the user interface. Alternatively, the user is able to manually identify the item 102 or recipient to the agent 107 (e.g. by manually entering the item identifier and/or recipient identifier). The agent 107 of the device 104 then automatically generates a redemption value ('redemptionSalt'), using the cryptographically secure random number generator. Next the agent 107 is able to create a redemption token ('redemptionToken') by hashing the identifier of the intended recipient ('recipientIdentity') and the redemption value ('redemptionSalt') together in order to create a one-time code that allows only the intended recipient to accept the transfer of the item 102/digital identity/item identifier. For example, the hash is able to be:

redemptionToken=hash(recipientIdentity||redemptionSalt)

The agent 107 then generates a zero-knowledge proof ('senderProof') that allows the transaction agent to verify that the sender/transferor is authorized to make the transaction (e.g. in the same manner as the proofs created for the hashes during registration). A sample implementation of the sender circuit is able to comprise:

```
function senderCircuit(x, w) {
    return (
        hash(w.identifier || w.identifierSalt) == x.identifierHash &&
        hash(w.senderIdentity || w.custodyPass || w.identifierSalt) == x.custodianHash &&
        hash(w.recipientIdentity || w.redemptionSalt) == x.redemptionToken
    )
}
``` where x represents the public input and w represents the private input. Additionally, the agent 107 automatically sends a private message to the recipient (e.g. to the agent 107 on the device 104 of the recipient), the message comprising the item identifier ('identifier'), the salt value ('identifierSalt'), the redemption value ('redemptionSalt') and the sender proof ('senderProof'). The redemption token and the identifier hash do not need to be sent be sent because the recipient is able produce them from the other values (e.g. redemptionToken=hash(recipientIdentity||redemptionSalt); and identifierHash=hash(identifier||identifierSalt)). In some embodiments, the message might also contain the sender identity (senderIdentity), for example, if the sender operates with multiple identities using the same communication channel for private messages.

Upon receiving the message from the agent 107 of the device 104 of the sender/transferor, the agent 107 of the recipient device 104 randomly generates a new custody pass via the cryptographic random number generator and hashes it with their identifier ('recipient identifier') on the system 100 (e.g. public key, GSI company prefix) in order to generate a new custodian hash. Further, using one or more of these values, the agent 107 on the recipient device 104 generates a zero-knowledge proof ('recipientProof') that allows the transaction agent to verify that the recipient/transferee authorizes the receiving of the item 102/digital identity/item identifier (e.g. in the same manner as the creation of the sender and registration proofs described above). Specifically, in some embodiments the recipient proof is based on and "proves" that the recipient knows the item identifier ('identifier'), the salt value ('identifierSalt'), the redemption value ('redemptionSalt'), the recipient identifier ('recipientIdentity') as well as the new custody pass ('custodyPass'). A sample implementation of the recipient circuit is able to comprise:

```
function recipientCircuit(x, w) {
    return (
        hash(w.identifier || w.identifierSalt) == x.identifierHash &&
        hash(w.recipientIdentity || w.newCustodyPass || w. identifierSalt) == x.recipientCustodyHash &&
        hash(w.recipientIdentity || w.redemptionSalt) == x.redemptionToken
    )
}
``` where x represents the public input and w represents the private input. The recipient device 104 is then able to initiate the transfer function on the distributed ledger 106 by contacting a transaction agent on the distributed ledger 106 that is associated with the item 102. In some embodiments, the agent 107 it able to determine the transaction agent based on the values transmitted in the message from the transferor/sender device 104. Alternatively, the distributed ledger 106 determines the appropriate transaction agent and/or the agent 107 enables and/or prompts the user to identify the desired transaction agent. The recipient device 104 sends a message including the identifier hash, the redemption token, the new custodian hash, the sender proof and the recipient proof to the transaction agent along with the request for transfer of the item 102 on the distributed ledger 106.

In some embodiments, the recipient agent 107 verifies the existence of the identifier hash on the distributed ledger 106 before submitting the message with the request for transfer. The recipient agent 107 calculates the identifier hash from the item identifier and the salt value, both transmitted by the sender agent 107 in the private message. In some embodiments, the identifier hash is included in the private message by the sender agent 107. The recipient agent 107 calculates the redemption token from the known recipient identity and the redemption value, transmitted by the sender agent 107 in the private message. In some embodiments, the redemption token is included in the private message by the sender agent 107. Alternatively, in some embodiments the recipient device 104 sends the message back to the sender device 104, wherein the agent 107 of the sender device 104 then automatically transmits the message to the transaction agent on the distributed ledger 106.

Upon receipt of the message from the recipient device 104, the transaction agent then verifies the validity of the transaction (against business rules stored for the transaction agent and current state) by verifying the validity of the received sender proof and recipient proof Specifically, the transaction agent verifies that both the transaction initiator (e.g. transfer/sender agent 107) and the transaction recipient (e.g. transferee/recipient) know, store or have access to source values (e.g. item identifier, salt value, sender/transferor identifier, recipient/transferee identifier, custody pass value, new custody pass value, redemption value) which resulted in provided hashes (e.g. identifier hash, old custodian hash, new custodian hash, redemption token using the proofs to verify the hashes).

If the values are successfully verified, the transaction agent adds the new custodian hash (that was generated by the recipient) as the current custodian hash that is associated with the item identification hash (either replacing the existing custodian hash or archiving the existing custodian hash to form a recorded chain of custody). This new association between the new custodian hash and the identifier hash is stored as a part of the digital identity (e.g. a chain of custody field) on the ledger of the distributed ledger 106. This, process can be repeated multiple times throughout the supply chain in order to ensure the validity of the custodial changes using the transaction agents. As a result, the actual identities of the item 102, the registrant and/or any other data is able to be protected despite the transfer being recorded and accessible on the ledger of the distributed ledger 106. As such, the system solves computer/the distributed ledger based problem of achieving confidentiality on a distributed ledger 106 ledger that needs to be accessible.

A sample implementation of the transaction agent transfer/verification function is as follows:

```
function transfer(bytes32 identifierHash, bytes32 recipientCustodyHash, bytes32
redemptionToken, bytes senderProof, bytes recipientProof) {
        var hashes = custodianHashes[identifierHash]
        bytes32 custodianHash = hashes[hashes.length - 1];
        bool senderProofIsCorrect = zksnarkverify(senderCircuitVerificationKey,
        [identifierHash, custodianHash, redemptionToken], senderProof);
        bool recipientProofIsCorrect = zksnarkverify(recipientCircuitVerificationKey,
        [identifierHash, recipientCustodyHash, redemptionToken], recipientProof);
        if(senderProofIsCorrect && recipientProofIsCorrect) {
        custodianHashes[identifierHash].push(recipientHash);
    }
}
```

Where 'zksnarkverify' is a zk-SNARK function of the transaction agent that verifies the correctness of the proofs. 'senderCircuitProvingKey', 'senderCircuitVerificationKey', 'recipientCircuitProvingKey' and 'recipientCircuitVerificationKey' are the key pairs generated by a trusted set of people for the zk-SNARK that is able to be used for the system 100. Thus, the validity of the sender proof and the recipient proof is able to be cryptographically verified by using zk-SNARK which tests a number of transfer requirements. In some embodiments, the transfer requirements comprise the sender identifier corresponding to the current custodian hash. In some embodiments, the transfer requirements comprise the sender knowing the asset identifier, the salt value, the sender identity, the custody pass and the redemption value. In some embodiments, the transfer requirements comprise the recipient knowing the asset identifier, the salt value, the recipient identity, the new custody pass and the redemption value. In some embodiments, the transfer transactions posted to the transaction agent by the recipient and sender devices 104 can be split in two separate transactions: a transfer initiation posted by the sender to the transaction agent and a transfer acceptance posted by the recipient to the transaction agent.

A third party verifier (such as a regulator) can request to the system 100 the provenance of an identifier/item 102. As for any distributed ledger observer, a verifier can only lookup the proxy state from the ledger (i.e. the item identification hashes and custodian hashes). As a result, in order to verify one or more aspects of a transaction the verifier must send a request to the participants for proof of provenance of a specific item. This prevents the verifier from obtaining knowledge without the consent of the participants.

Specifically, upon receiving a command to verify a transaction, the agent 107 of the verifying device 104 broadcasts a verification request for a certain item 102/item identifier. The item identifier is able to be entered by the verifier into the agent 107 along with the verification command using the user interface of the agent 107. The broadcasting is able to be achieved via direct messaging to the devices 104 of one or more of the parties to the transaction or by creating an entry on the distributed ledger. In some embodiments, the agent 107 of the verification device 104 is able to utilize a public key assigned to the verifier/agent 107 to encrypt the enquiry and/or an application programming interface (API) uniform resource locator (URL) for receiving responses from the parties. In some embodiments, the agents 107 of the sender/recipient devices 104 monitor the network or the distributed ledger for such verification requests. Once they see a request for an item/item identifier that they had custody of, the agents 107 respond with proof of custody data. For example, the proof of custody data is able to comprise one or more of the registrant identifiers, the custody pass, the salt value and/or any of the other values described above.

Alternatively, other methods of proof of custody (such as zero-knowledge proofs) can be adopted. In some embodiments, the agents 107 of the parties are able to encrypt their response (e.g. with the public key provided by the verifier). Once the agent 107 of the verification device 104 collects all the proof of custody data, it is able to automatically verify the data against the data stored by the transaction agent on the distributed ledger 106 and confirm that each party has had custody of the item/digital identity/item identifier in the specified order.

In other words, in some embodiments upon selection of a verification function of the verification agent, the verification device via the verification function generates and transmits a verification request including the asset identifier of the asset that is to be verified to all secure transfer devices (i.e., a broadcast), receives all proofs of custody from any transfer device that has taken part in any registration or transfer of the asset, verifies the validity and completeness of the proofs of custody against the data recorded on the distributed ledger. In some embodiments, a proof of custody is composed by the identity of the party, the custody pass, the alternative asset identifier, and optionally the previous custodian and the next custodian when available. In some embodiments, the verification request is serially submitted to each the transfer devices starting from the registrant, for instance when the registrant is known or the registrant identifier is included in the asset identifier.

Figure 2:
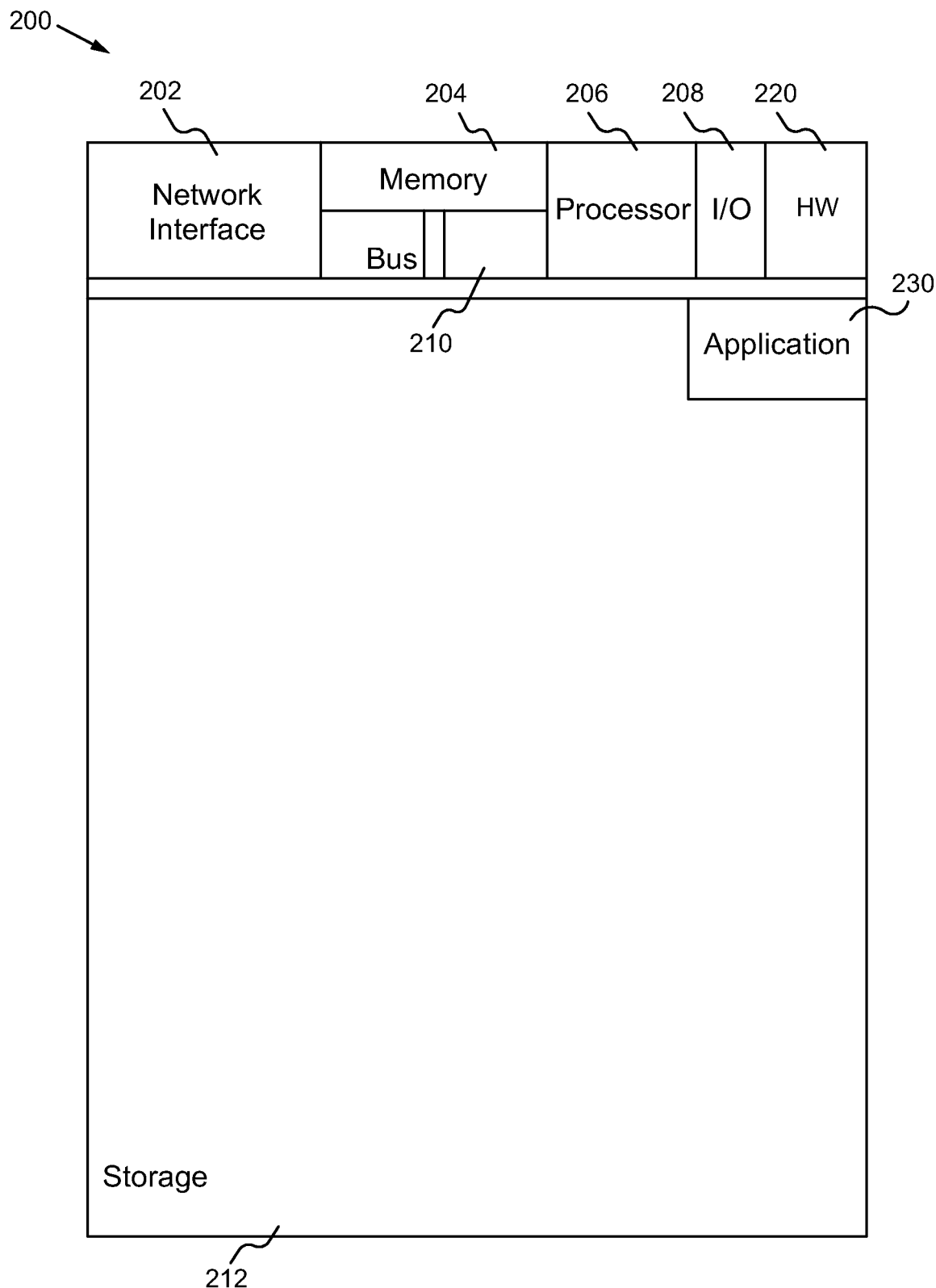
FIG. 2 illustrates a block diagram of an exemplary computing device configured to implement the system according to some embodiments.

FIG. 2 illustrates a block diagram of an exemplary computing device 200 configured to implement the system 100 according to some embodiments. In addition to the features described above, the transfer devices 104 and/or servers are able to be substantially similar to the device 200. In general, a hardware structure suitable for implementing the computing device 200 includes a network interface 202, a memory 204, a processor 206, I/O device(s) 208 (e.g. reader), a bus 210 and a storage device 212. Alternatively, one or more of the illustrated components are able to be removed or substituted for other components well known in the art. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. The agent 107 or function(s)/module(s) thereof are likely to be stored in the storage device 212 and memory 204 and processed as applications are typically processed. More or fewer components shown in FIG. 2 are able to be included in the computing device 200. In some embodiments, secure transfer system hardware 220 is included. Although the computing device 200 in FIG. 2 includes applications 230 and hardware 220 for the system 100, the system 100 is able to be implemented on a computing device in hardware, firmware, software or any combination thereof.

Figure 3:
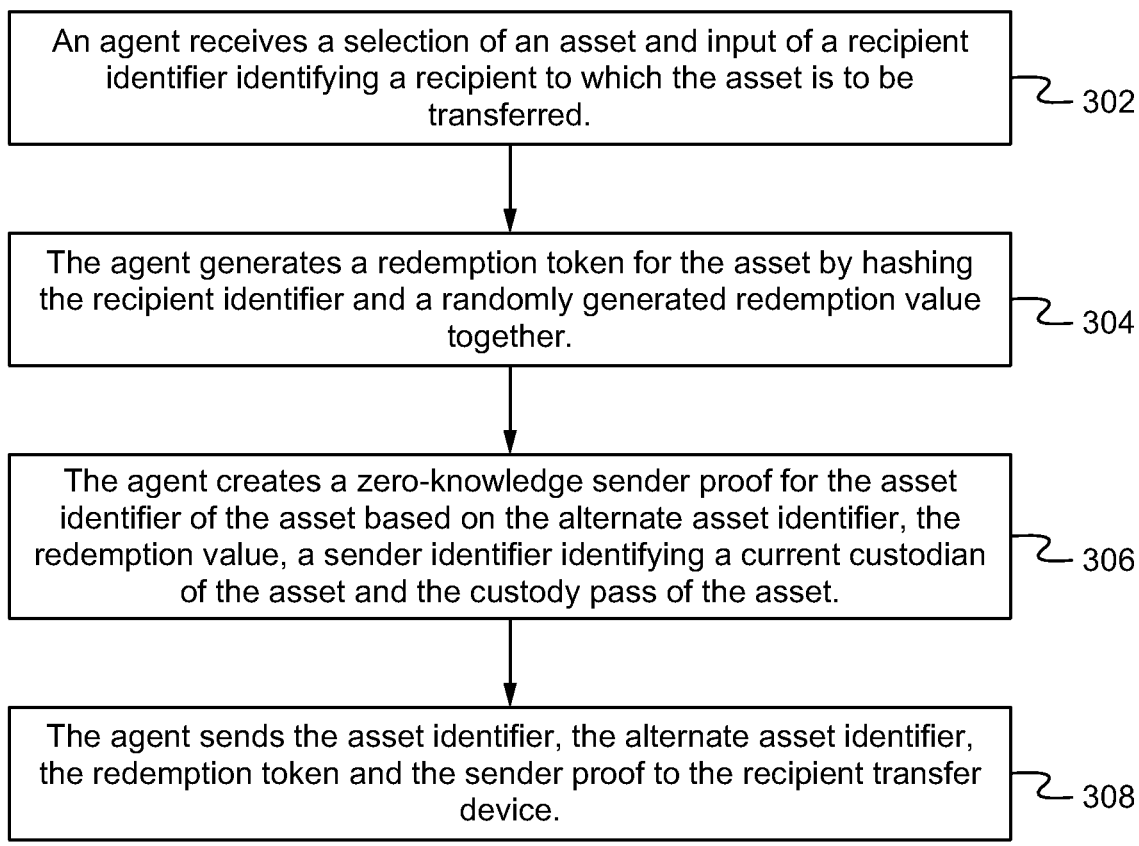
FIG. 3 illustrates a method of operating a secure transfer system according to some embodiments.

FIG. 3 illustrates a method of operating a secure transfer system 100 according to some embodiments. As shown in FIG. 3, an agent 107 of the transfer device 104 receives a selection of an asset and input of a recipient identifier identifying a recipient to which the asset is to be transferred at the step 302. The agent 107 of the transfer device 104 generates a redemption token for the asset by hashing the recipient identifier and a randomly generated redemption value together at the step 304. The agent 107 of the transfer device 104 creates a zero-knowledge sender proof for the asset identifier of the asset based on the salt value, the redemption value, a sender identifier identifying a current custodian of the asset and the custody pass of the asset at the step 306. The agent 107 of the transfer device 104 sends the asset identifier, the salt value, the redemption token and the sender proof to the recipient transfer device at the step 308.

In some embodiments, the transaction agent associates the identifier hash of the asset with a custodian hash. In some embodiments, the transaction agent changes the custodian hash associated with the identifier hash of the asset to a different custodian hash that is derived from a different custodian identifier identifying a new current custodian of the asset when one or more transfer requirements are met. In some embodiments, the transfer agent 107 of the recipient device 104 receives selection of a receive function of the transfer agent for the asset, generates a new custody pass for the asset and a new custodian hash for the asset based on the recipient identifier and the new custody pass, creates a zero-knowledge recipient proof for the asset identifier of the asset, the salt value, the redemption value, the recipient identifier and the new custody pass and invokes a transfer function of the transaction agent on the distributed ledger and submitting the identifier hash of the asset, the new custodian hash, the redemption token, the sender proof and the recipient proof to the transaction agent. In some embodiments, upon invocation of the transfer function, the transaction agent verifies the validity of the sender proof and the recipient proof, and if valid, changes the custodian hash associated with the identifier hash of the asset to the new custody hash.

In some embodiments, the transfer agent 107 of one of the devices 104 receives selection of a registration function, creates the asset identifier, the salt value and the custody pass, generates the identifier hash based on a hash of the asset identifier and the salt value, generates the custodian hash based on a hash of the sender identifier, the custody pass and the salt value, generates a zero-knowledge registration proof for the identifier hash and the custodian hash, invokes a registration function of the transaction agent on the distributed ledger 106 and submits the identifier hash of the asset, the custodian hash and the zero-knowledge registration proof to the transaction agent. In such embodiments, upon invocation of the registration function, the transaction agent verifies that the identifier hash does not already exist on the distributed ledger, verifies the validity of the registration proof, and if valid, changes the custodian hash associated with the identifier hash of the asset to the new custody hash and if the identifier does not already exist and the registration proof is valid, associates the identifier hash with the custodian hash on the distributed ledger.

In some embodiments, the transfer agent 107 of one the devices 104 receives selection of a verification function of a verification agent, generates and transmits a verification request including the asset identifier of the asset that is to be verified to a desired secure transfer device, receives the custody pass, the alternative asset identifier and the sender identifier or the recipient identifier from the secure transfer device, and submits the custody pass, the alternative asset identifier and the sender identifier or the recipient identifier to the transaction agent for verification that at least one previous or current value of the custodian hash is derived from the sender identifier or the recipient identifier.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. For example, although as described herein an item identifier has been associated with a single item 102, a single item identifier is able to be associated with a plurality of items 102 wherein the plurality of items represent a single group item 102 that is registered/transferred/verified as a group on the distributed ledger 106. For example, in some embodiments an approach to tie an identifier registration to a registrant is able to comprise one or more key pairs are assigned to each registrant, enabling each registrant to declare public keys to trading partners (e.g. on distributed ledger) and generate unique signatures for each identifier registered in the system; implementing access control management in the system, it will be possible to assign the "registrant" role to participants that are authorized to create identifier; and/or using an identifier that contains the identifier of the registrant, wherein the system verifies that only the authorized registrant creates identifier with the assigned identifier. An example of this implementation is the "company prefix" coded in the SGTIN of the EPC standard from GS1.

What is claimed is:

1. A zero knowledge transfer system for transferring one or more physical assets each associated with a physical asset identifier, a salt value, a custody pass and an identifier hash, the system comprising:
   a distributed ledger stored on a non-transitory computer readable medium and including at least one transaction agent and a ledger, the ledger associating the identifier hash of each of the physical assets with a custodian hash that is derived from a custodian identifier identifying a current custodian of the physical asset, wherein the at least one transaction agent includes a transfer function that changes the custodian hash associated with the identifier hash of one of the physical assets on the ledger to a different custodian hash that is derived from a different custodian identifier identifying a new current custodian of the physical asset on the ledger if one or more transfer requirements are completed;

a receiving device including a receiving device memory storing a first secure transfer agent, the first secure transfer agent having a receive function; and a transferring device including a transferring device memory storing a second secure transfer agent, the second secure transfer agent having a transmit function, wherein upon selection of an asset of the physical assets, and input of recipient identifier identifying a recipient to which the physical asset is to be transferred, the transferring device via the transmit function:

generates a redemption token for the physical asset by hashing the recipient identifier and a randomly generated redemption value together;

creates a zero-knowledge sender proof for the physical asset identifier of the physical asset based on the salt value, the redemption value, a sender identifier identifying a current custodian of the physical asset and the custody pass of the physical asset; and sends the physical asset identifier, the salt value and the sender proof to the receiving device.

2. The system of claim 1, wherein upon selection of the receive function for the physical asset, the receiving device via the receive function:

generates a new custody pass for the physical asset and a new custodian hash for the physical asset based on the recipient identifier and the new custody pass;

creates a zero-knowledge recipient proof for the physical asset identifier of the physical asset based on the salt value, the redemption value, the recipient identifier and the new custody pass; and invokes the transfer function of the transaction agent on the distributed ledger and submits the identifier hash of the physical asset, the new custodian hash, the redemption token, the sender proof and the recipient proof to the transaction agent;

wherein the redemption token is determined by the receiving device by one of a group consisting of:

receiving the redemption token from the transferring device; and locally recalculating the redemption token.

3. The system of claim 2, wherein upon invocation of the transfer function, the transaction agent verifies the validity of the sender proof and the recipient proof, and if valid, changes the custodian hash associated with the identifier hash of the physical asset to the new custody hash.

4. The system of claim 3, wherein the transfer requirements comprise the sender identifier corresponding to the current custodian hash.

5. The system of claim 4, wherein upon selection of a registration function of the second secure transfer agent, the transferring device via the registration function:

creates the physical asset identifier, the salt value and the custody pass;

generates the identifier hash based on a hash of the physical asset identifier and the salt value, generates the custodian hash based on a hash of the sender identifier, the custody pass and the salt value and generates a zero-knowledge registration proof for the identifier hash and the custodian hash; and invokes a registration function of the transaction agent on the distributed ledger and submits the identifier hash of the physical asset, the custodian hash and the zero-knowledge registration proof to the transaction agent.

6. The system of claim 5, wherein upon invocation of the registration function, the transaction agent:

verifies that the identifier hash does not already exist on the distributed ledger;

verifies the validity of the registration proof, and if valid, changes the custodian hash associated with the identifier hash of the physical asset to the new custody hash; and if the identifier does not already exist and the registration proof is valid, associates the identifier hash with the custodian hash on the distributed ledger.

7. The system of claim 6, further comprising a verification device including a verification agent, wherein upon selection of a verification function of the verification agent, the verification device via the verification function:

generates and transmits a verification request including the physical asset identifier of the physical asset that is to be verified to both the first secure transfer agent and the second secure transfer agent; and verifies the validity and completeness of the proofs against data associated with the physical asset identified by the physical asset identifier on the distributed ledger.

8. A method of securely transferring one or more physical assets each associated with a physical asset identifier, a salt value, a custody pass and an identifier hash, the method comprising:

receiving, with a first transfer agent of a first secure transfer device, a selection of a physical asset of the physical assets, and input of a recipient identifier identifying a recipient to which the physical asset is to be transferred;

generating a redemption token for the physical asset with the first transfer agent by hashing the recipient identifier and a randomly generated redemption value together;

creating a zero-knowledge sender proof for the physical asset identifier of the physical asset with the first transfer agent based on the salt value, the redemption value, a sender identifier identifying a current custodian of the physical asset and the custody pass of the physical asset; and sending the physical asset identifier, the salt value and the sender proof to a second secure transfer device with the first transfer agent.

9. The method of claim 8, further comprising associating the identifier hash of the physical asset with a custodian hash with a transaction agent of a distributed ledger, wherein the distributed ledger includes at least one transaction agent and a ledger, the ledger storing the association of the identifier hash and the custodian hash, wherein the custodian hash is derived from a custodian identifier identifying a current custodian of the physical asset.

10. The method of claim 9, further comprising changing the custodian hash associated with the identifier hash of the physical asset to a different custodian hash that is derived from a different custodian identifier identifying a new current custodian of the physical asset with the transaction agent when one or more transfer requirements are completed.

11. The method of claim 10, further comprising:

receiving, with a second transfer agent of the second secure transfer device, selection of a receive function of the second transfer agent for the physical asset;

generating a new custody pass for the physical asset and a new custodian hash for the physical asset with the second transfer agent based on the recipient identifier and the new custody pass;

creating a zero-knowledge recipient proof for the physical asset identifier of the physical asset based on the salt value, the redemption value, the recipient identifier and the new custody pass with the second transfer agent;

determining the redemption token with the second secure transfer device by one of a group consisting of:
receiving the redemption token from the first secure transfer device; and
locally recalculating the redemption token; and invoking a transfer function of the transaction agent on the distributed ledger and submitting the identifier hash of the physical asset, the new custodian hash, the redemption token, the sender proof and the recipient proof to the transaction agent with the second transfer agent.

12. The method of claim 11, wherein upon invocation of the transfer function, the transaction agent verifies the validity of the sender proof and the recipient proof, and if valid, changes the custodian hash associated with the identifier hash of the physical asset to the new custody hash.

13. The method of claim 12, wherein the transfer requirements comprise the sender identifier corresponding to the current custodian hash.

14. The method of claim 13, further comprising:
receiving selection of a registration function of the first transfer agent with the first secure transfer device;
creating the physical asset identifier, the salt value and the custody pass with the agent;
generating the identifier hash with the agent based on a hash of the physical asset identifier and the salt value;
generating the custodian hash with the agent based on a hash of the sender identifier, the custody pass and the salt value;
generates a zero-knowledge registration proof for the identifier hash and the custodian hash with the agent;
invoking a registration function of the transaction agent on the distributed ledger with the agent; and
submitting the identifier hash of the physical asset, the custodian hash and the zero-knowledge registration proof to the transaction agent with the agent.

15. The method of claim 14, wherein upon invocation of the registration function, the transaction agent:
verifies that the identifier hash does not already exist on the distributed ledger;
verifies the validity of the registration proof, and if valid, changes the custodian hash associated with the identifier hash of the physical asset to the new custody hash; and
if the identifier does not already exist and the registration proof is valid, associates the identifier hash with the custodian hash on the distributed ledger.

16. The method of claim 15, further comprising:
receiving selection of a verification function of a verification agent of a verification device;
generating and transmitting a verification request including the physical asset identifier of the physical asset that is to be verified to both the first and the second secure transfer devices with the verification agent; and
verifying the validity and completeness of the proofs against data associated with the physical asset identified by the physical asset identifier on the distributed ledger.

17. A secure transfer device for transferring one or more physical assets each associated with a physical asset identifier, a salt value, a custody pass and an identifier hash, the device comprising:
a display;
a processor; and
a non-transitory computer readable memory storing a secure transfer agent including a transmit function, wherein upon selection of a physical asset of the physical assets and input of recipient identifier identifying a recipient to which the physical asset is to be transferred, the secure transfer agent:
generates a redemption token for the physical asset by hashing the recipient identifier and a randomly generated redemption value together;
creates a zero-knowledge sender proof for the physical asset identifier of the physical asset based on the salt value, the redemption value, a sender identifier identifying a current custodian of the physical asset and the custody pass of the physical asset; and
sends the physical asset identifier, the salt value and the sender proof to a receiving device.

18. The device of claim 17, wherein a distributed ledger includes at least one transaction agent and a ledger, the ledger associating the identifier hash of each of the physical assets with a custodian hash that is derived from a custodian identifier identifying a current custodian of the physical asset, wherein the at least one transaction agent includes a transfer function that changes the custodian hash associated with the identifier hash of one of the physical assets to a different custodian hash that is derived from a different custodian identifier identifying a new current custodian of the physical asset if one or more transfer requirements are completed, and further wherein the receiving device has a receiving agent includes a receiver function and upon selection of the receive function for the physical asset, the receiving agent:
generates a new custody pass for the physical asset and a new custodian hash for the physical asset based on the recipient identifier and the new custody pass;
creates a zero-knowledge recipient proof for the physical asset identifier of the physical asset based on the salt value, the redemption value, the recipient identifier and the new custody pass; and
invokes the transfer function of the transaction agent on a distributed ledger and submits an identifier hash of the physical asset, the new custodian hash, the redemption token, the sender proof and the recipient proof to the transaction agent;

wherein the redemption token is determined by the receiving device by one of a group consisting of:
receiving the redemption token from the secure transfer agent; and
locally recalculating the redemption token.

19. The device of claim 18, wherein the agent includes a registration function and upon selection of the registration function, the agent:
creates the physical asset identifier, the salt value and the custody pass;
generates the identifier hash based on a hash of the physical asset identifier and the salt value, generates the custodian hash based on a hash of the sender identifier, the custody pass and the salt value and generates a zero-knowledge registration proof for the identifier hash and the custodian hash; and
invokes a registration function of the transaction agent on the distributed ledger and submits the identifier hash of the physical asset, the custodian hash and the zero-knowledge registration proof to the transaction agent.

20. The device of claim 19, wherein the agent includes a verification function and upon selection of the verification function, the agent:
   generates and transmits a verification request including the physical asset identifier of the physical asset that is to be verified to all other secure transfer devices in communication with the device; and
   verifies the validity and completeness of the proofs against data associated with the physical asset identified by the physical asset identifier on the distributed ledger.

* * * * *